(12) United States Patent
Hino (10) Patent No.: US 8,756,662 B2
(45) Date of Patent: Jun. 17, 2014

(54) USER AUTHENTICATION SYSTEM AND PLANT CONTROL SYSTEM HAVING USER AUTHENTICATION SYSTEM

(75) Inventor: Yasutaka Hino, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 141 days.

(21) Appl. No.: 13/280,863

(22) Filed: Oct. 25, 2011

(65) Prior Publication Data

US 2012/0110648 A1  May 3, 2012

(30) Foreign Application Priority Data

Oct. 27, 2010  (JP) .................................. P2010-240572

(51) Int. Cl.
*G06F 21/00* (2013.01)
(52) U.S. Cl.
USPC ................ 726/4; 726/1; 726/2; 726/5; 380/2; 380/42
(58) Field of Classification Search
USPC ....................................................... 726/4, 28
See application file for complete search history.

(56) References Cited

U.S. PATENT DOCUMENTS

| | | | |
|---|---|---|---|
| 6,219,439 B1 * | 4/2001 | Burger ........................... | 382/115 |
| 8,490,154 B2 * | 7/2013 | Gomez et al. ..................... | 726/2 |
| 2003/0145221 A1 | 7/2003 | Atzmuellet et al. | |
| 2008/0244719 A1 | 10/2008 | Hariya et al. | |
| 2012/0054650 A1 * | 3/2012 | Bliss et al. .................... | 715/764 |

FOREIGN PATENT DOCUMENTS

| | | |
|---|---|---|
| EP | 1621944 A2 | 2/2006 |
| GB | 2452635 A | 3/2009 |

OTHER PUBLICATIONS

Service Portability of Networked Appliances; Moyer et al; Communications Magazine, IEEE, 2002.*
Lastest Computer Technology 2001, "Domain for Collectively Managing a Plurality of Servers," NikkeiBP, Oct. 17, 2000.
Extended European Search Report in corresponding European Patent Application No. 11186638.0 dated Apr. 5, 2012.

* cited by examiner

*Primary Examiner* — Jason Lee
(74) *Attorney, Agent, or Firm* — Sughrue Mion, PLLC (57) ABSTRACT

A plant control system may include a manipulation monitoring terminal that includes a local user authentication unit configured to authenticate a user who logs in the manipulation monitoring terminal and a domain controller that includes a domain user authentication unit and communicates with the manipulation monitoring terminal. The manipulation monitoring terminal may include a user authentication alarm unit configured to generate a security alarm when the local user authentication unit performs user authentication on the user in a state in which the domain controller is in normal operation.

11 Claims, 5 Drawing Sheets

USER AUTHENTICATION SYSTEM AND PLANT CONTROL SYSTEM HAVING USER AUTHENTICATION SYSTEM

BACKGROUND OF THE INVENTION

1. Field of the Invention

The present invention relates to a user authentication system that authenticates a user who logs in a manipulation monitoring terminal, and a plant control system having the user authentication system.

Priority is claimed on Japanese Patent Application No. 2010-240572, filed Oct. 27, 2010, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Figure 4:
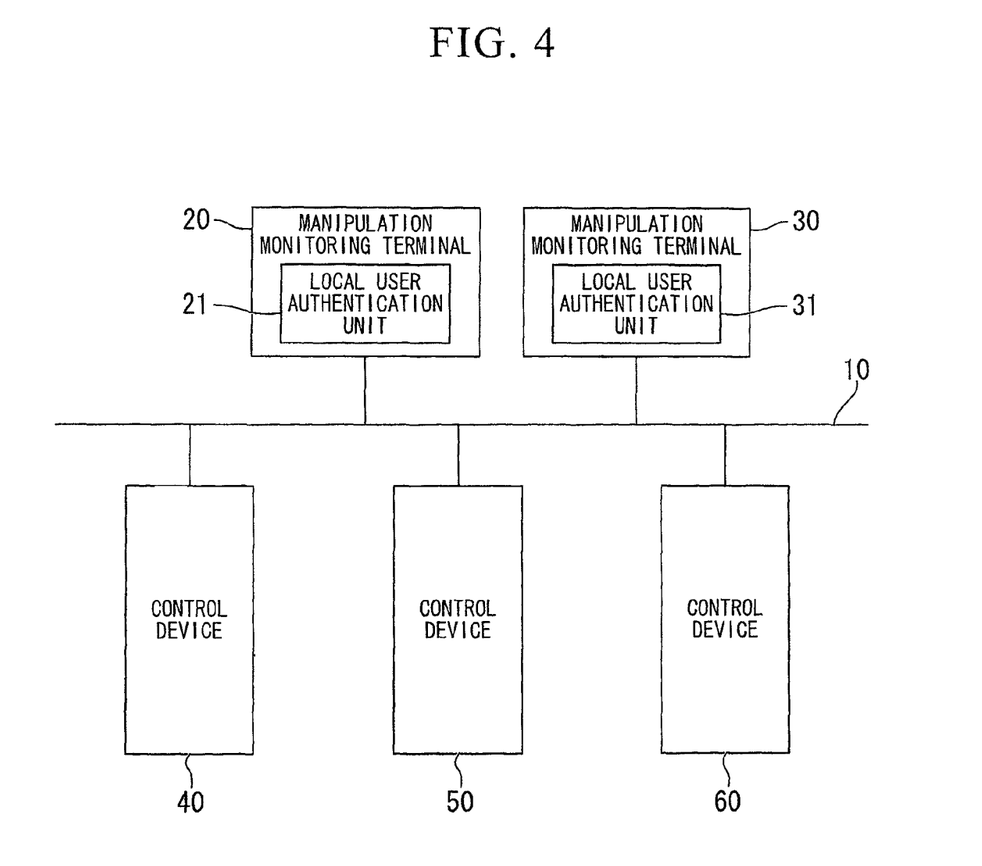
FIG. 4 is a functional block diagram illustrating an example of a constitution of a user authentication system in a plant control system in accordance with the related art.

FIG. 4 is a functional block diagram illustrating an example of a constitution of a user authentication system in a plant control system in accordance with the related art. The plant control system includes a control bus 10, manipulation monitoring terminals 20 and 30, and control devices 40, 50 and 60.

The manipulation monitoring terminals 20 and 30, and the control devices 40, 50 and 60 are each connected to the control bus 10. The control devices 40, 50 and 60 communicate with the manipulation monitoring terminals 20 and 30 via the control bus 10, thereby controlling a field device of a plant.

In general, control devices and a control bus are redundant to ensure the continuity of a plant operation at a high level. Also, manipulation monitoring terminals can perform functions of each other. In this way, an operation of a plant is not disabled due to problems with one manipulation monitoring terminal.

For security reasons, manipulation monitoring terminals authenticate users who log in. In the example of the constitution of FIG. 4, local user authentication units 21 and 31 separately mounted in the plant control system are included in the manipulation monitoring terminals 20 and 30 respectively, and authenticate users who log in. User authentication is performed by the respective local user authentication units, and thus is independent in the respective manipulation monitoring terminals.

Figure 5:
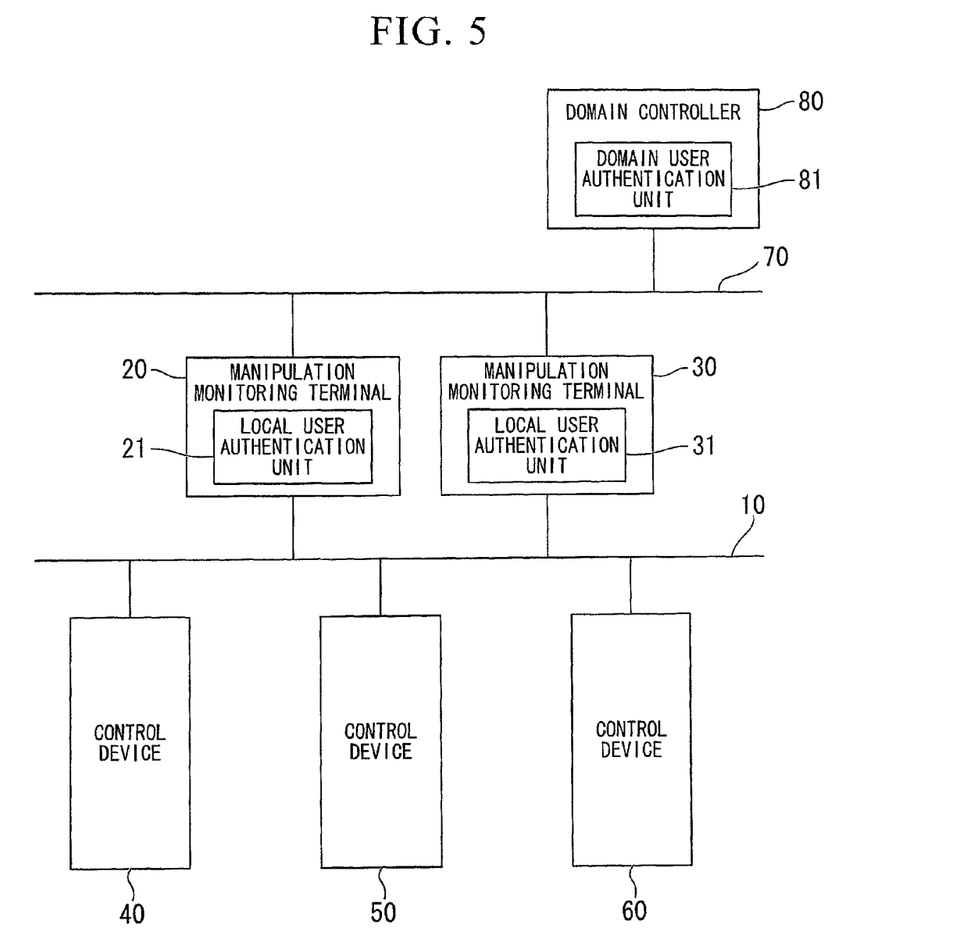
FIG. 5 is a functional block diagram illustrating another example of a constitution of a user authentication system in a plant control system in accordance with the related art.

FIG. 5 is a functional block diagram illustrating another example of a constitution of a user authentication system in a plant control system in accordance with the related art. FIG. 5 shows an example of a user authentication system using a function of a general operating system (OS), for example, a domain management mechanism of Windows.

The plant control system includes a control bus 10, manipulation monitoring terminals 20 and 30, control devices 40, 50 and 60, an information network 70, and a domain controller 80. The manipulation monitoring terminals 20 and 30, and the control devices 40, 50 and 60 are each connected to the control bus 10. The manipulation monitoring terminals 20 and 30 and the domain controller 80 are each connected to the information network 70.

The manipulation monitoring terminals 20 and 30 communicate with the domain controller 80 through the information network 70. The domain controller 80 has a domain user authentication unit 81. The domain user authentication unit 81 manages user names and passwords of all users belonging to a corresponding domain.

Local user authentication units 21 and 31 separately mounted in the plant control system are included in the manipulation monitoring terminals 20 and 30 respectively, and authenticate users who log in. When a user authentication operation is performed by the local user authentication units 20 and 30, a user name and password that a user has input are transferred to the domain controller 80 through the information network 70. The domain user authentication unit 81 of the domain controller 80 authenticates the user name and password, and the user authentication is successful when the user name and password are verified.

In the user authentication system using the domain controller 80, user management is not performed by the respective manipulation monitoring terminals 20 and 30 but is intensively performed by the domain controller 80. In this way, the following four advantages are obtained.

1. Duplication of user names can be prevented.
2. Passwords of a user can be unified in the overall system.
3. The overall system is rapidly informed of user registration and deletion, password change, account log-out, and the like.
4. Only one administrator of a domain controller is authorized to authenticate a user in a domain. Thus, it is impossible to manage users with administrator rights for each manipulation monitoring terminal, and the security level is improved.

In the user authentication system using the domain controller 80 in accordance with the related art, the domain controller 80 and the information network 70 may generally become redundant. However, the domain controller 80 and the information network 70 do not have a high reliability as high as the control devices 40, 50 and 60 or the control bus 10. Thus, when user authentication is intensively managed by the domain controller 80, the availability of the overall system may be lowered to a level of the availability of the domain controller 80 and the information network 70.

When user authentication is managed by the local user authentication units mounted in the respective manipulation monitoring terminals, the level of availability can be maintained, but the above-mentioned security advantage cannot be obtained.

SUMMARY

The present invention implements a user authentication system capable of improving security while maintaining the availability of a system.

A plant control system may include a manipulation monitoring terminal that includes a local user authentication unit configured to authenticate a user who logs in the manipulation monitoring terminal and a domain controller that includes a domain user authentication unit and communicates with the manipulation monitoring terminal. The manipulation monitoring terminal may include a user authentication alarm unit configured to generate a security alarm when the local user authentication unit performs user authentication on the user in a state in which the domain controller is in normal operation.

The security alarm may be reported to another manipulation monitoring terminal connected with the manipulation monitoring terminal through a control bus.

When the domain controller is not in normal operation, the local user authentication unit may perform user authentication on the user.

When the domain controller is in normal operation, the user authentication alarm unit may generate the security alarm, and then the local user authentication unit may perform user authentication on the user.

The user authentication alarm unit may generate the security alarm regardless of whether or not the domain controller is in normal operation, and then the local user authentication unit may perform user authentication on the user.

A user authentication system may authenticate a user who logs in a manipulation monitoring terminal in a control system. The control system may include the manipulation monitoring terminal that includes a local user authentication unit and a domain controller that includes a domain user authentication unit and communicates with the manipulation monitoring terminal. The manipulation monitoring terminal may include a user authentication alarm unit configured to generate a security alarm when the local user authentication unit performs user authentication on the user in a state in which the domain controller is in normal operation.

A user authentication method may include a first step of determining whether or not to perform a local user authentication. If it is determined not to perform the local user authentication, then the user authentication method may further include a second step of performing a user authentication by using a domain controller. If it is determined to perform the local user authentication, then the user authentication method may further include a third step of informing a user authentication alarm unit that local user authentication has been attempted using a signal, a fourth step of informing other manipulation monitoring terminal that local user authentication has been attempted as a security alarm, a fifth step of displaying on a manipulation monitoring terminal that local user authentication has been attempted, and a sixth step of making a collation with user information managed by a local user information storage unit by using the local user authentication unit.

If it is determined to perform the local user authentication, then the user authentication method may further include a seventh step of determining whether or not a domain controller is in normal operation. If the domain controller is in normal operation, then the third step, the fourth step, the fifth step and the sixth step may be executed. If the domain controller is not in normal operation, then the sixth step may be executed.

According to the present invention, the following effects can be expected.

(1) When user authentication of a domain is performed normally, an operation can be performed while maintaining security.

(2) When user authentication of a domain is not performed normally, a plant operation can be performed through local authentication with security deterioration accepted as an emergency action.

(3) When local user authentication is used despite domain user authentication being performed normally, there may be a security breach, and thus it is possible to sound an alarm.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

Figure 1:
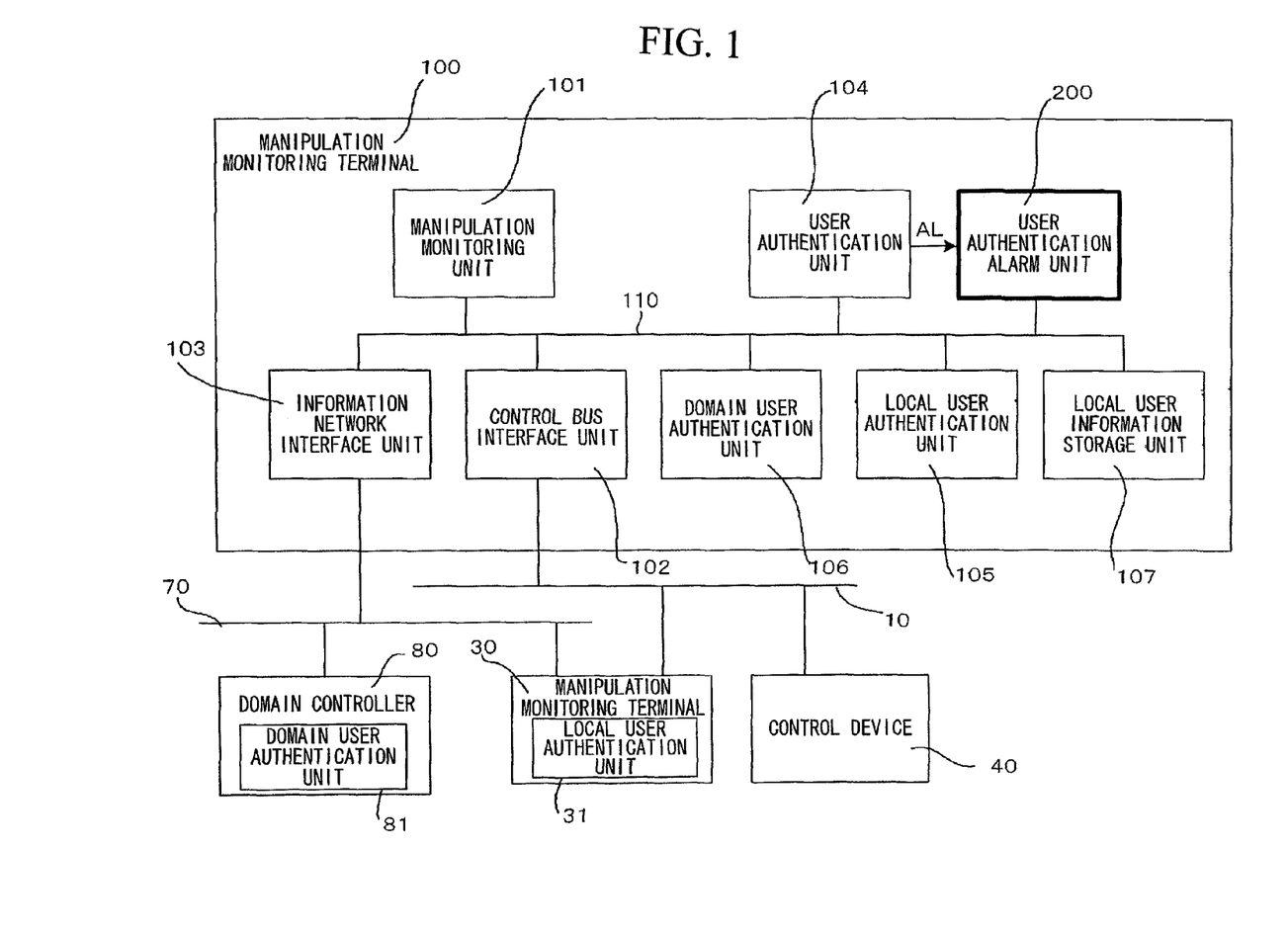
FIG. 1 is a functional block diagram illustrating an example of a user authentication system in accordance with a first preferred embodiment of the present invention.

FIG. 1 is a functional block diagram illustrating an example of a user authentication system in accordance with a first preferred embodiment of the present invention. The same numerals will be given to the same elements as in the user authentication system illustrated in FIG. 5 in accordance with the related art, and description thereof will be omitted.

A plant control system includes a control bus 10, manipulation monitoring terminals 30 and 100, a control device 40, an information network 70, and a domain controller 80. The manipulation monitoring terminals 30 and 100 and the control device 40 are each connected to the control bus 10. The manipulation monitoring terminals 30 and 100 and the domain controller 80 are each connected to the information network 70. The control device 40 communicates with the manipulation monitoring terminals 30 and 100 through the control bus 10, thereby controlling a field device of a plant.

The manipulation monitoring terminal 100 includes a manipulation monitoring unit 101, a control bus interface unit 102, an information network interface unit 103, a user authentication unit 104, a local user authentication unit 105, a domain user authentication unit 106, a local user information storage unit 107, an internal bus 110, and a user authentication alarm unit 200. The local user authentication unit 105 and the domain user authentication unit 106 operate as internal functions of the user authentication unit 104.

The manipulation monitoring unit 101, the control bus interface unit 102, the information network interface unit 103, the user authentication unit 104, the local user authentication unit 105, the domain user authentication unit 106, and the local user information storage unit 107 are each connected to the internal bus 110.

The manipulation monitoring unit 101, the control bus interface unit 102, the information network interface unit 103, the user authentication unit 104, the local user authentication unit 105, the domain user authentication unit 106, and the local user information storage unit 107 are components generally included in a general manipulation monitoring terminal.

The manipulation monitoring unit 101 includes a user interface that displays data received from the control device 40 and gives the control device 40 an instruction, and an internal function. The control bus interface unit 102 communicates with the control device 40 or the other manipulation monitoring terminal 30 through the control bus 10. The information network interface unit 103 communicates with the domain controller 80 through the information network 70.

The user authentication unit 104 authenticates a user who logs in the manipulation monitoring terminal 100. At this time, functions of the local user authentication unit 105 and the domain user authentication unit 106 are used. The user authentication unit 105 queries the local user information storage unit 107 to perform user authentication. The domain user authentication unit 106 queries the domain controller 80 to perform user authentication.

The local user information storage unit 107 stores user information managed by the manipulation monitoring terminal 100. The user information stored in the local user information storage unit 107 is used when at least one of the information network interface unit 103, the domain controller 80, and the information network 70 is not in normal operation.

A user authentication operation in accordance with the present invention will be described below according to "Operation Scenario 1" to "Operation Scenario 4".

Operation Scenario 1

An operation of the user authentication unit 104 queries the domain controller 108 to perform user authentication when the entire system, including the domain controller 80 and the information network 70, is in normal operation will be described herein.

(1-1) To perform a manipulation monitoring operation, a domain user authentication operation is performed by the manipulation monitoring terminal 100.

(1-2) The user authentication unit 104 attempts user authentication using the domain user authentication unit 106.

(1-3) The domain user authentication unit 106 queries the domain controller 108 through the information network interface unit 103 and the information network 70.

(1-4) The domain controller 80 makes a collation of user information. When the domain controller 80 succeeds in making the collation of user information, user authentication is successful.

Operation Scenario 2

An operation performed when at least one of the domain controller 80, the information network 70, and the information network interface unit 103 is not available will be described herein. In this case, if the user authentication unit 104 attempts domain user authentication, user authentication is not successful because the domain controller 80 cannot makes a collation of user information. As a result, the manipulation monitoring terminal 100 is not available, and a plant operation is affected. Thus, in this situation, local user authentication is performed.

(2-1) To perform a manipulation monitoring operation, the manipulation monitoring terminal 100 performs a local user authentication operation.

(2-2) The user authentication unit 104 determines whether or not the domain controller 80 is in normal operation using the information network interface unit 103 and the information network 70. When the domain controller 80 is in normal operation, "Operation Scenario 4" that will be described later is performed, and then the scenario proceeds to (2-3). When the domain controller 80 is not in normal operation, the scenario proceeds directory to (2-3).

As mentioned above, at least one of the domain controller 80, the information network 70, and the information network interface unit 103 is not available in Operation Scenario 2. Thus, the domain controller 80 is regarded not to be in normal operation, and the scenario proceeds directly to (2-3).

(2-3) The user authentication unit 104 makes a collation with user information managed by the local user information storage unit 107 using the local user authentication unit 105. When the collation is successful, user authentication is successful.

Operation Scenario 3

An operation of the local user authentication unit 105 performing user authentication when the entire system, including the domain controller 80 and the information network 70, is in normal operation will be described herein.

(3-1) To perform a manipulation monitoring operation, the local user authentication unit 105 of the manipulation monitoring terminal 100 performs a local user authentication operation.

(3-2) The user authentication unit 104 determines whether or not the domain controller 80 is in normal operation using the information network interface unit 103 and the information network 70. In Operation Scenario 3, the domain controller 80 is regarded to be in normal operation. Thus, "Operation Scenario 4" that will be described later is performed, and then the scenario proceeds to (3-3).

(3-3) The user authentication unit 104 makes a collation with user information managed by the local user information storage unit 107 using the local user authentication unit 105. When the collation is successful, user authentication is successful.

Operation Scenario 4

An operation performed when the local user authentication unit 105 attempts user authentication even though the domain controller 80 is available will be described herein.

(4-1) The user authentication unit 104 informs the user authentication alarm unit 200 that local user authentication has been attempted using a signal AL.

(4-2) The user authentication alarm unit 200 informs an alarm management function of the other manipulation monitoring terminal 30 that local user authentication has been attempted through the control bus interface unit 102 and the control bus 10.

(4-3) The manipulation monitoring terminal 100 displays that local user authentication has been attempted using the manipulation monitoring terminal 100.

Figure 2:
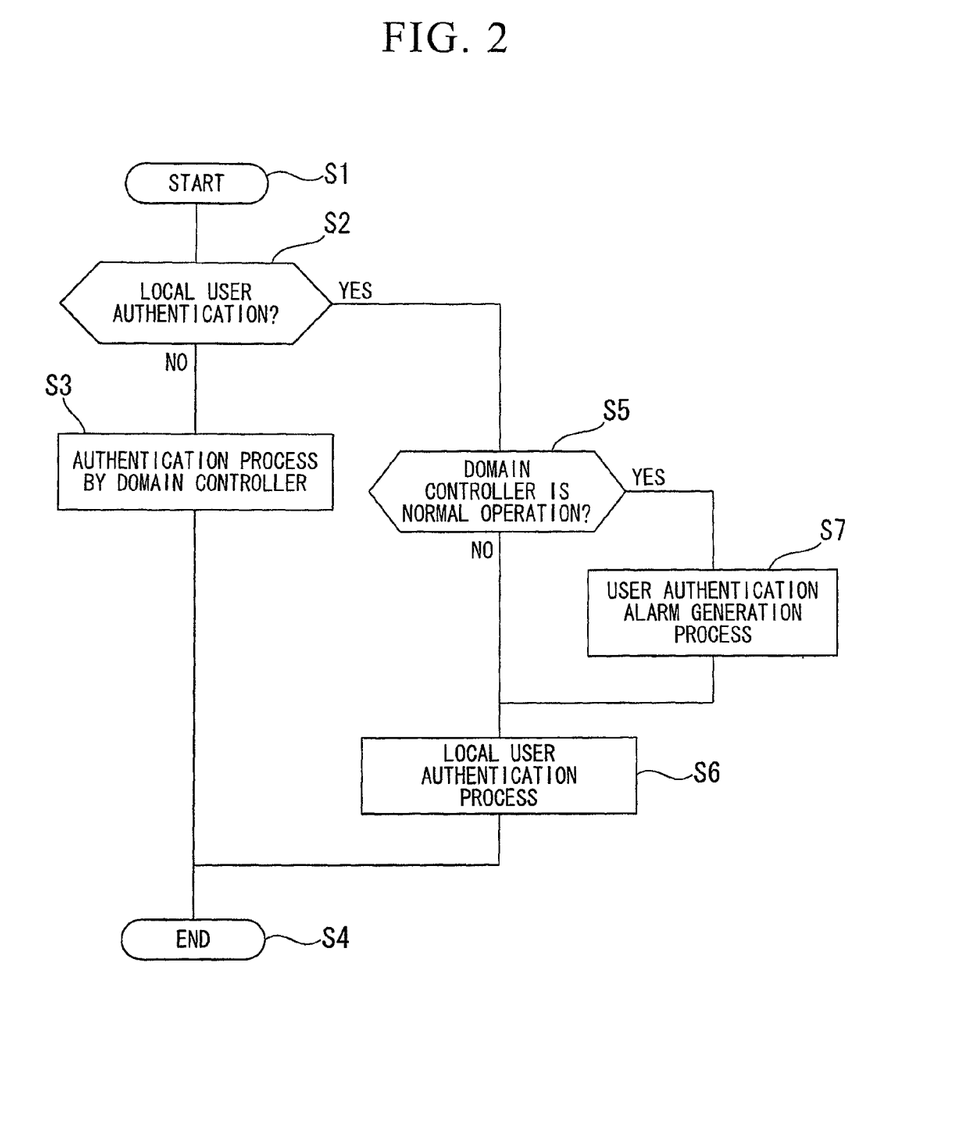
FIG. 2 is a flowchart illustrating a signal processing procedure of the user authentication system in accordance with the first preferred embodiment of the present invention.

FIG. 2 is a flowchart illustrating a signal processing procedure of the user authentication system in accordance with the first preferred embodiment of the present invention. In FIG. 2, the operation (2-2) of Operation Scenario 2 and the operation (3-2) of Operation Scenario 3 are illustrated as a flowchart.

In step S1, a process is started. Next, in step S2, it is determined whether or not to perform local user authentication. In the case of domain user authentication, when user authentication in the domain controller, including the information network, is in normal operation, the process proceeds to step S3. In step S3, when a manipulation monitoring terminal is used, user authentication is performed by the domain controller. Subsequently, the process ends in step S4.

When it is determined in step S2 that it is the case of local user authentication, the process proceeds to step S5. In step S5, it is determined whether or not the domain controller is in normal operation. When the user authentication in the domain controller is not in normal operation and it is necessary to perform manipulation monitoring without waiting for a domain user authentication function to recover, the process proceeds to step S6. In step S6, local user authentication is performed as an emergency action.

When it is determined in step S5 that the user authentication in the domain controller is in normal operation, the process proceeds to step S7 because it is not preferable, for security reasons, to use local user authentication as an action other than an emergency action. In step S7, a user authentication alarm generation process is performed, so that it is reported as a security warning that local user authentication has been attempted using the manipulation monitoring terminal. The warning is transmitted to another manipulation monitoring terminal, and another user is informed of the warning. Subsequently, the process proceeds to step S6, and a local user authentication process is performed.

A mechanism for transmission and notification of the security warning involves the control bus 10. As long as the control bus 10 is in normal operation to perform an operation, transmission and notification are successful.

Figure 3:
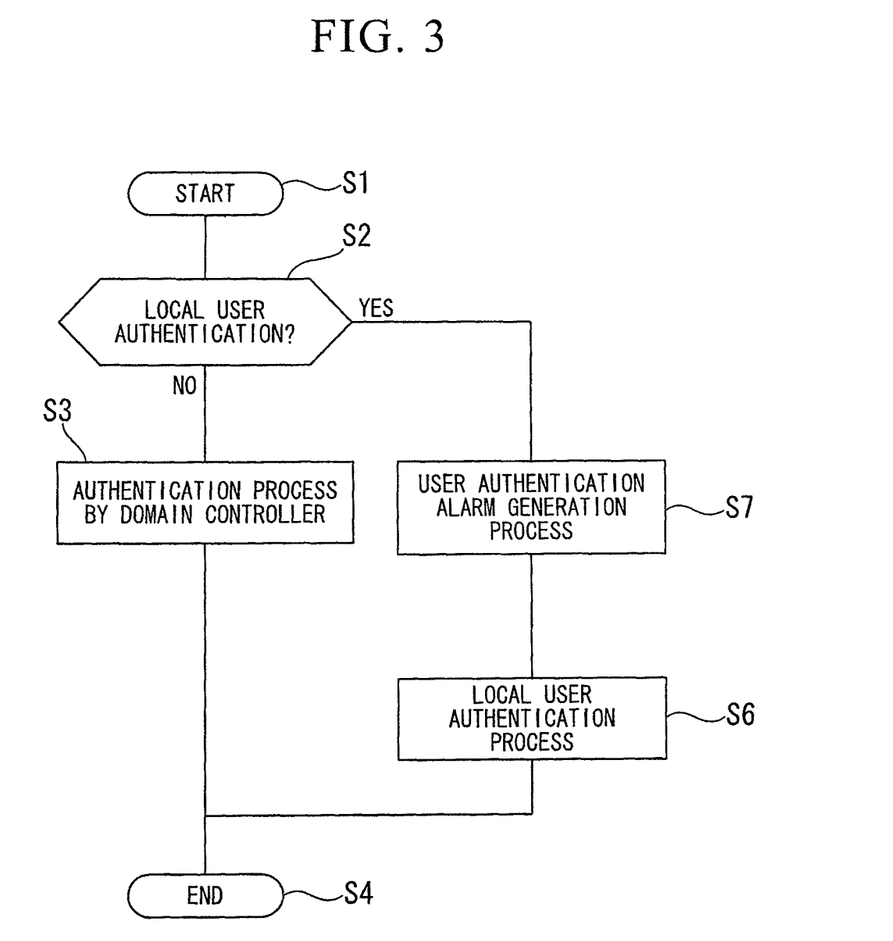
FIG. 3 is a flowchart illustrating another signal processing procedure of the user authentication system in accordance with the first preferred embodiment of the present invention.

FIG. 3 is a flowchart illustrating another signal processing procedure of the user authentication system in accordance with the first preferred embodiment of the present invention. In FIG. 3, step S5 of FIG. 2 is omitted. In FIG. 2, a security warning is issued when local user authentication is attempted despite the domain controller being in normal operation. In this way, the number of alarm generations in a plant operation is limited.

FIG. 3 illustrates a case in which a security level is raised and a security warning is issued every time local user authentication is attempted.

In step S1, a process is started. Next, in step S2, it is determined whether or not to perform local user authentication. When local user authentication is not performed, the process proceeds to step S3. In step S3, user authentication is performed by a domain controller. Subsequently, the process ends in step S4.

When it is determined in step S2 that local user authentication is performed, the process proceeds to step S7. In step S7, a user authentication alarm generation process is performed, so that it is reported as a security warning that local user authentication has been attempted using a manipulation monitoring terminal. The warning is transmitted to another manipulation monitoring terminal, and another user is informed of the warning. Subsequently, the process proceeds to step S6, and a local user authentication process is performed.

The term "configured" is used to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, section or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A plant control system comprising:
   a manipulation monitoring terminal that includes a local user authentication unit configured to authenticate a user who logs in the manipulation monitoring terminal; and
   a domain controller that includes a domain user authentication unit and configured to communicate with the manipulation monitoring terminal,
   wherein the manipulation monitoring terminal includes a user authentication alarm unit configured to generate a security alarm when the local user authentication unit performs user authentication on the user in a state in which the domain controller is available to communicate with the manipulation monitoring terminal,
   wherein the security alarm is reported to another manipulation monitoring terminal connected with the manipulation monitoring terminal through a control bus, and
   wherein the local user authentication unit is configured to perform user authentication on the user when the domain controller is unavailable to communicate with the manipulation monitoring terminal.

2. The plant control system according to claim 1, wherein the user authentication alarm unit is configured to generate the security alarm when the domain controller is available to communicate with the manipulation monitoring terminal, and then the local user authentication unit is configured to perform user authentication on the user.

3. The plant control system according to claim 2, wherein the security alarm is reported to another manipulation monitoring terminal connected with the manipulation monitoring terminal through a control bus.

4. The plant control system according to claim 1, wherein the user authentication alarm unit is configured to generate the security alarm regardless of whether or not the domain controller is available to communicate with the manipulation monitoring terminal, and then the local user authentication unit is configured to perform user authentication on the user.

5. The plant control system according to claim 4, wherein the security alarm is reported to another manipulation monitoring terminal connected with the manipulation monitoring terminal through a control bus.

6. A user authentication system that authenticates a user who logs in a manipulation monitoring terminal in a control system, the control system comprising:
   the manipulation monitoring terminal that includes a local user authentication unit; and
   a domain controller that includes a domain user authentication unit and is configured to communicate with the manipulation monitoring terminal,
   wherein the manipulation monitoring terminal includes a user authentication alarm unit configured to generate a security alarm when the local user authentication unit performs user authentication on the user in a state in which the domain controller is available to communicate with the manipulation monitoring terminal,
   wherein the security alarm is reported to another manipulation monitoring terminal connected with the manipulation monitoring terminal through a control bus, and
   wherein the local user authentication unit is configured to perform user authentication on the user when the domain controller is unavailable to communicate with the manipulation monitoring terminal.

7. The user authentication system according to claim 6, wherein the user authentication alarm unit is configured to generate the security alarm when the domain controller is available to communicate with the manipulation monitoring terminal, and then the local user authentication unit is configured to perform user authentication on the user.

8. The user authentication system according to claim 7, wherein the security alarm is reported to another manipulation monitoring terminal connected with the manipulation monitoring terminal through a control bus.

9. The user authentication system according to claim 6, wherein the user authentication alarm unit is configured to generate the security alarm regardless of whether or not the domain controller is available f to communicate with the manipulation monitoring terminal, and then the local user authentication unit is configured to perform user authentication on the user.

10. The user authentication system according to claim 9, wherein the security alarm is reported to another manipulation monitoring terminal connected with the manipulation monitoring terminal through a control bus.

11. The user authentication system according to claim 1, further comprising:
   a control device configured to communicate with the manipulation monitoring terminal, thereby controlling a field device of a plant.

* * * * *